(12) United States Patent
Thanomsat et al.

(10) Patent No.: US 6,480,364 B1
(45) Date of Patent: Nov. 12, 2002

(54) THERMALLY COMPENSATED ROTARY POSITIONING SYSTEM FOR A DISC DRIVE

(75) Inventors: Chayakorn Thanomsat, Bloomington, MN (US); David Douglass Koester, Chanhassen, MN (US); Roger Alan Resh, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 99 days.

(21) Appl. No.: 09/585,254

(22) Filed: May 31, 2000

Related U.S. Application Data
(60) Provisional application No. 60/158,835, filed on Oct. 12, 1999.

(51) Int. Cl.$^7$ ............................. G11B 33/14; G11B 5/55
(52) U.S. Cl. ............................. 360/265.7; 360/265.8; 360/97.02
(58) Field of Search ..................... 360/265.7, 265.8, 360/265.6, 264.3, 264.7, 264.8, 264.9, 265, 97.02, 97.03

(56) References Cited

U.S. PATENT DOCUMENTS

| | | | |
|---|---|---|---|
| 4,639,798 A | * | 1/1987 | Harrison et al. ............... 360/73 |
| 4,775,908 A | | 10/1988 | Ycas |
| 4,879,617 A | | 11/1989 | Sampietro et al. |
| 5,050,026 A | | 9/1991 | Goss |
| 5,130,874 A | | 7/1992 | Watrous |
| 5,148,071 A | | 9/1992 | Takahashi |
| 5,247,410 A | * | 9/1993 | Ebihara et al. ............... 360/106 |
| 5,382,851 A | | 1/1995 | Loubier |
| 5,448,437 A | | 9/1995 | Katahara |
| 5,517,372 A | | 5/1996 | Shibuya et al. |
| 5,528,091 A | | 6/1996 | Loubier et al. |
| 5,557,152 A | | 9/1996 | Gauthier |
| 5,594,603 A | | 1/1997 | Mori et al. |
| 5,656,877 A | | 8/1997 | Loubier |
| 5,691,581 A | | 11/1997 | Umehara et al. |
| 5,698,911 A | | 12/1997 | Dunfield et al. |
| 5,768,061 A | | 6/1998 | Casey et al. |
| 6,078,477 A | * | 6/2000 | Adams et al. ............... 360/106 |
| 6,181,530 B1 | * | 1/2001 | Ratliff et al. ............ 360/265.8 |

* cited by examiner

Primary Examiner—William Klimowicz
(74) Attorney, Agent, or Firm—Derek J. Berger

(57) ABSTRACT

Apparatus and method for cooling the actuator coil with a suitable heat sink structure. The heat sink thermally couples the coil to one or more of the head-carrying arms, which are positioned close enough to the disc stack that rotation of the stack cools them. In one embodiment, a gap is formed between the coil and a thermal conduit, and the gap is made wide enough to allow a majority of the gap to be filed with a solid dielectric. Another embodiment is a method for controlling the minimum gap thickness. In yet another embodiment, a rotary actuator includes a heat conduit with a concave surface for bonding to the coil, increasing rigidity and thermal conduction.

9 Claims, 5 Drawing Sheets

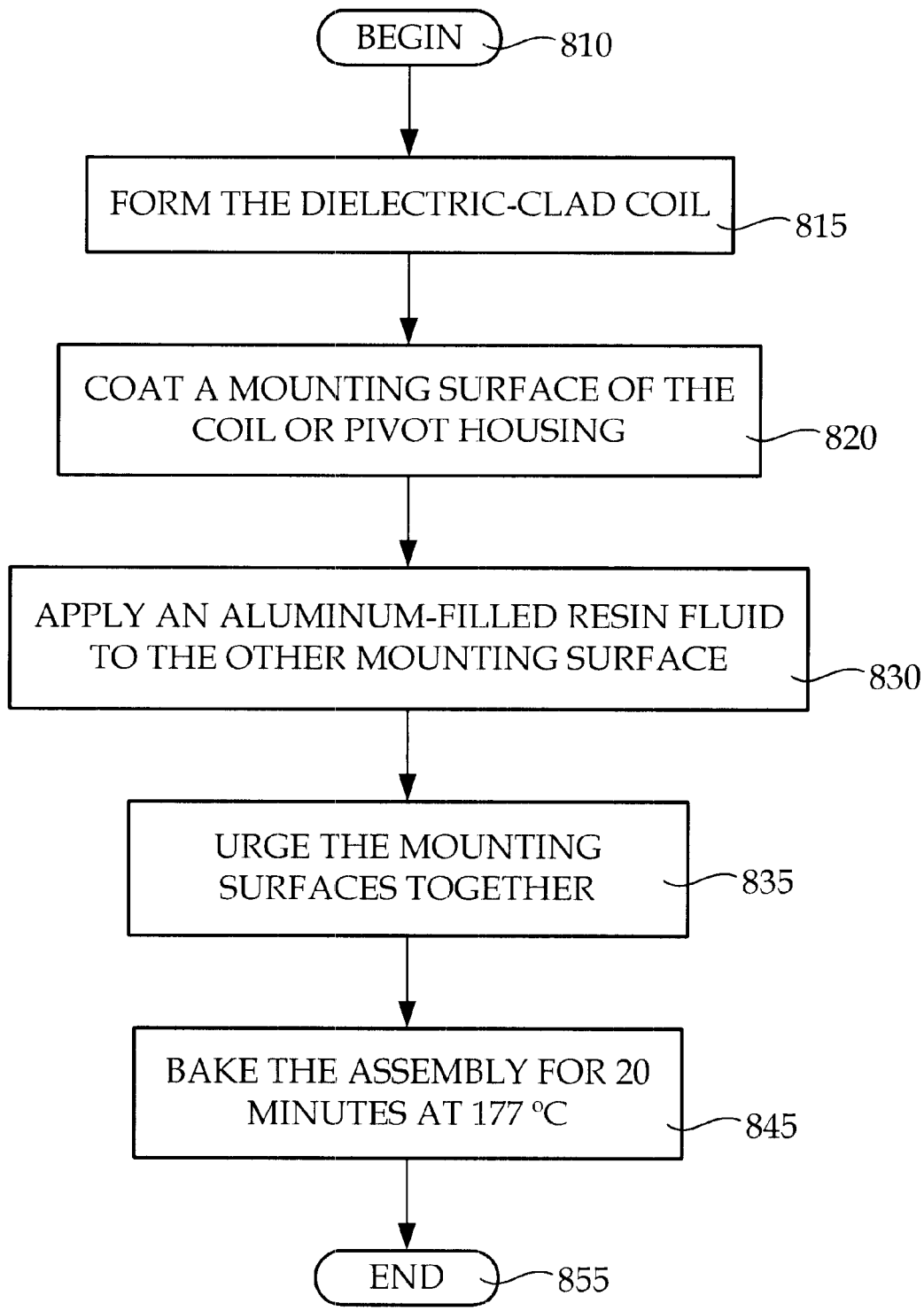

THERMALLY COMPENSATED ROTARY POSITIONING SYSTEM FOR A DISC DRIVE

RELATED APPLICATIONS

This application claims the benefit of U.S. Provisional Application No. 60/158,835 filed on Oct. 12, 1999.

FIELD OF THE INVENTION

The present invention relates to positioning systems, and more particular to highly precise servo positioning systems using voice coil motors, such as those employed in disc drives.

BACKGROUND OF THE INVENTION

Rotating disc memories include one or more discs driven about a vertical spindle axis. Each disc typically has a plurality of concentric tracks on one or both surfaces from which information is read or onto which information is written by means of reading and/or writing heads, i.e., a transducer head assembly. The information includes servo fields providing a position feedback input to a servo system which positions the head over the surface of the disc, generally moving the head over the tracks on the surface of the disc. The transducer head assembly is typically connected to a resilient member, such as a gimbal spring, which in turn is connected to an end of a track accessing arm.

A pivot housing typically includes (or couples to) several track accessing arms. Each track accessing arm on the pivot housing carries a transducer head assembly on a first end. A second end of each track accessing arm is connected to a central portion which forms an axis of rotation between at least one actuator coils and the actuator assembly. The actuator coil is attached to a coil support structure which also extends from a side of the central portion positioned opposite the track accessing arms. The actuator itself is placed proximate to a magnetic pole piece, which includes permanent magnets and a block formed of materials having ferromagnetic properties. A variety of configurations have been proposed for such coils and magnets. See U.S. Pat. No. 5,557,152 ("2-Pole Single or Dual Coil Moving Magnet Motor with Moving Back Iron") issued Sep. 17, 1995 to Raymond G. Gauthier; U.S. Pat. No. 5,448,437 ("Voice Coil Motor for Disk Drive") issued Sep. 5, 1995 to Naotoshi Katahara; U.S. Pat. No. 4,775,908 ("Moving Magnet Actuator") issued Oct. 4, 1988 to John A. Ycas.

Applying a current to the actuator coil positions and holds the transducer head assembly over selected concentric tracks of the magnetic media disc. The coil is selectively energized by the disc drive system to move with respect to the magnetic pole piece. The movement of the actuator coil is transferred to the transducer heads via the actuator support structure.

In an ideal track seek operation, the servo control system of the disc drive applies current to the actuator coil which is positioned proximate to the magnetic pole piece. The current applied to the actuator coil induces a transient magnetic field which emanates from the coil and interacts with a permanent magnetic field of the magnetic pole piece. The interaction of the permanent and transient magnetic fields causes movement of the actuator coil proximate to the magnetic pole piece.

In practice, however, the force imparted to the actuator coil when current flows through it excites natural frequencies in the actuator coil. In particular, out-of-plane bending (or bending back and forth of the coil) results in an off-track error of the transducer heads since the force is being imparted to a resonating coil.

Most low frequency resonances, including out-of-plane bending of voice coils are problematic since lower frequency resonances have larger displacements. There is also less gain margin in classical second order servo control systems at lower frequencies. Insufficient gain margin can cause the servo system to go classically unstable which shows up as off-track error at the transducer head. Gain margin at resonant peaks limits the bandwidth of the servo system. A servo system with a higher bandwidth is desirable since it can more accurately follow externally induced disturbances. Thus, in order to decrease off-track error and/or increase gain margin, it is desirable to affix the voice coil in a structure having higher natural frequencies.

One problem that has impeded effective voice coil mounting is the extreme temperature variations voice coils suffer during operation. Under worst case conditions of long, fast seeks in quick succession, coil temperatures can increase enough to increase their resistance significantly. Seek times have typically been minimized through the application of relatively large amounts of current to the coil during the acceleration and deceleration phases a seek operation. One way of reducing seek time is to increase the relative amount of current to the electric coil. However, as the current is increased the operating temperature of the coil likewise increases, as a proportionate amount of the electrical energy is dissipated as heat energy. The amount of current that can be passed through a coil is generally a function of its electrical resistance, which is directly affected by the temperature of the coil. As the temperature of the coil increases, the resistance of the coil increases, and the magnitude of the control current is limited, thereby adversely affecting the drive seek time. Moreover, elevated coil temperatures can also adversely affect the seek time performance by generally weakening the strength of the magnetic circuit of the magnet assembly.

Additionally, elevated voice coil motor temperatures can result in the degradation of adhesive and insulative materials used in the construction of the voice coil motor. Such degradation can lead to internal contamination of the disc drive as well as to the shorting of the coil.

Efforts have been made to reduce such temperature increases by using external means to cool the voice coil motor. For example, U.S. Pat. No. 5,517,372 ("Rotating Disk Storage Device with Cooling Air Flow Control") issued May 14, 1996 to Takeshi Shibuya et al., discloses a means for diverting air flowing over the discs to flow over the voice coil motor. However, such cooling efforts increase power consumption by creating increased drag upon the discs.

There is a continuing need in the industry for an improved actuator assembly with enhanced heat dissipation to facilitate cooling of the actuator coil without hindering the overall performance of the disc drive.

SUMMARY OF THE INVENTION

The present invention cools the actuator coil with a suitable heat sink structure. The heat sink thermally couples the coil to one or more of the head-carrying arms, which are positioned close enough to the disc stack that rotation of the stack cools them.

In one embodiment, a gap is formed between the coil and a thermal conduit, and the gap is made wide enough to allow a majority of the gap to be filed with a solid dielectric. By displacing air pockets that would otherwise form between the coil and the conduit, a higher thermal conduction and bonding strength is achieved.

In another embodiment, a thin protective layer is positioned on one of the bonding surfaces, and an adhesive (in liquid form) is also positioned between the bonding surfaces. The surfaces are then forced together, and the adhesive is cured. This is a cost-effective way to control the minimum gap thickness. In one embodiment, a layer about as thick as the coil's cladding is applied as a coating on the irregular mounting surface of the coil. Then, a liquid adhesive having a very high metal content (i.e. more than 50% by volume) is applied to the opposite mounting surface.

In yet another embodiment, a heat conduit includes a body with a rigid arm and a rigid layer protruding from it. The body, the arm, and the layer are joined structurally so as to provide a recess into which the coil protrudes. The recess provides a large mounting area facing the coil, for highly conductive and rigid support of the coil.

Other features and advantages of the present invention will become apparent upon a review of the following figures and their accompanying description.

BRIEF DESCRIPTION OF THE DRAWINGS

FIG. 8 shows a method for making an actuator assembly according to the present invention

DETAILED DESCRIPTION

Figure 1:
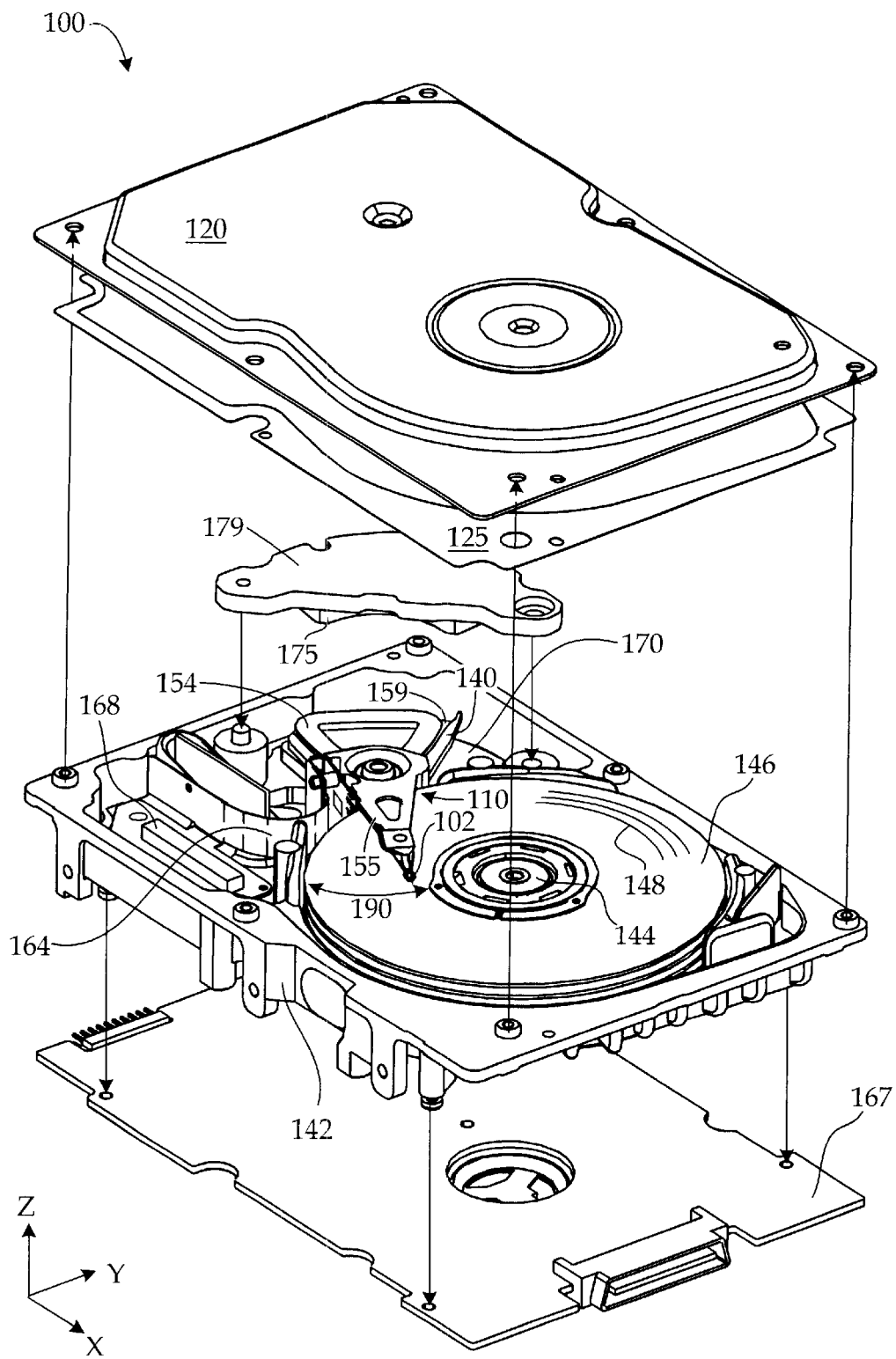
FIG. 1 shows a disc drive assembled according to the present invention, including a rotary pivot housing with a voice coil.

Numerous aspects of servo positioning systems that are not a part of the present invention, or are well known in the art, are omitted for brevity. These include (1) the composition of voice coils and voice coil magnets; (2) the selection of suitable adhesives/resins for injection molding; and (3) the design of tooling fixtures for injection molding or precision grinding. Although each of the many examples below shows more than enough detail to allow those skilled in the art to practice the present invention, subject matter regarded as the invention is broader than any single example below. The scope of the present invention is distinctly defined, however, in the claims at the end of this document.

Where practical, features shown in the figures are drawn to scale. Like reference numerals refer to like elements, throughout the following figures and descriptions. Definitions of certain terms are provided in conjunction with the figures, all consistent with common usage in the art but some described with greater specificity. For example, "vertical" refers to a direction perpendicular to a primary surface, as exemplified by the Z-axis shown in FIG. 1.

Except as noted, all quantitative and qualitative descriptors employ their broadest meaning consistent with industry usage. "Excess" heat energy in a coil refers to that which is associated with a temperature higher than a typical (median) temperature of passive components or circulating air 5–10 mm away from the coil. A conduit connecting two items "thermally couples" them if and only if (1) the conduit's volume-average thermal conductivity is closer to that of aluminum than that of air and (2) the cube of its length is less than 10000 times its volume.

FIG. 1 shows a disc drive 100 assembled according to the present invention, including a rotary pivot housing 110 with a voice coil 154. Disc drive 100 also includes base 142 and top cover 120, which both engage gasket 125 to form a sealed housing that maintains a clean environment inside disc drive 100. Discs 146 are mounted for rotation on spindle motor hub 144. Each disc 146 has two surfaces in the X-Y plane that rotate. Heads 102 are mounted on pivot housing 110 and positioned precisely to read annular data tracks 148 of discs 146. The pivot housing 110 is adapted for pivotal motion under control of a voice coil motor (VCM) comprising voice coil 154 and voice coil magnets 170,175 to controllably move heads 102 to a desired track 148 along an arcuate path 190. VCM magnets 170,175 are sandwiched between magnetically permeable plates 179 that help to concentrate flux. Arcuate path 190 crosses several thousand data tracks 148 between the two extremes of its stroke. Signals used to control the VCM and heads 102 pass via a flex circuit 164 and a connector 168 to and from electronic circuitry on controller board 167. The construction and operation of many disc drives of this general type are known in the art.

The present structure improves performance and/or manufacturability by a convenient thermal coupling between voice coil 154 and actuator arms 155. During operation, discs 146 rotate several thousand times per minute, providing excellent flow-induced cooling (i.e. forced convection) over exposed horizontal surfaces of each actuator arm 155. Coil 154 is preferably coupled to yoke arm 140 and other parts of pivot housing 110 by epoxy 159 having an average thickness less than 0.5 mm. A preferred embodiment of the present invention provides a thermal coupling between coil 154 and arms 155 that is large enough that most heat generated in the voice coil will exit the voice coil by conduction.

Figure 2:
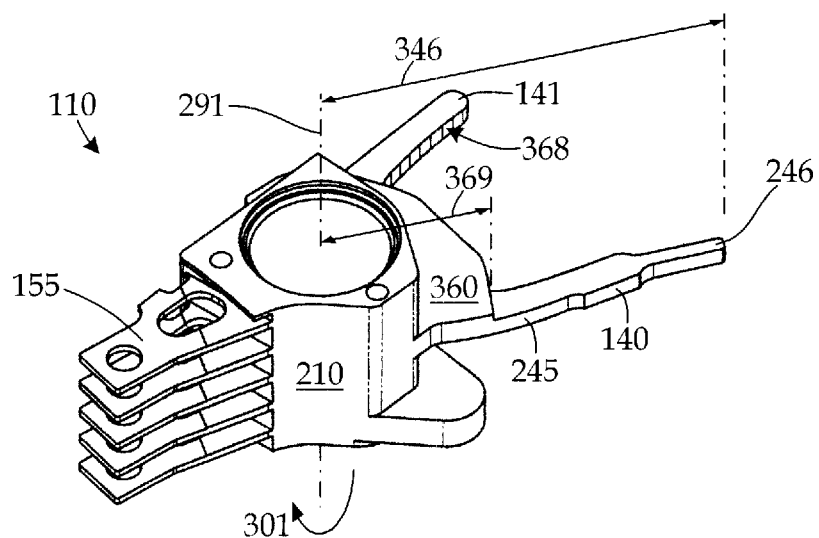
FIG. 2 is a more detailed view of the rotary pivot housing of FIG. 1 showing its axis of rotation.

FIG. 2 is a more detailed view of pivot housing 110 showing axis 291 about which it rotates. Body 210, head support arms 155, coil support arms 140,141, and structural layer 360 are preferably formed integrally, such as by machining a single piece of extruded aluminum. Structural layer 360 overlaps part of each coil support arm 140,141, yet has a farthest radial extent 369 that is preferably less than 80% of the longest coil support member 346. This allows structural layer 360 to provide a high degree of structural support to coil 154 and arm 140 without passing between voice coil magnets 170,175. The portion of each arm 140, 141 passing between voice coil magnets 170,175 desirably has a circumferential and vertical extent about equal to the width 377 and thickness 378 of coil 154, respectively. This configuration avoids horizontal vibrations and magnet interactions which are believed detrimental to effective head positioning. Structural layer 360 desirably improves the rigidity of coil support member 346 without adding more than a few percent to the rotational inertia of pivot housing 110. Arm 140 is shown with a proximal portion 245 and a distal portion 246. It is desirable that distal portion 246 be supported rigidly to avoid resonances less than about 1.5 kHz (coil yoke bending), especially if distal portion 246 engages a latching mechanism.

Figure 3:
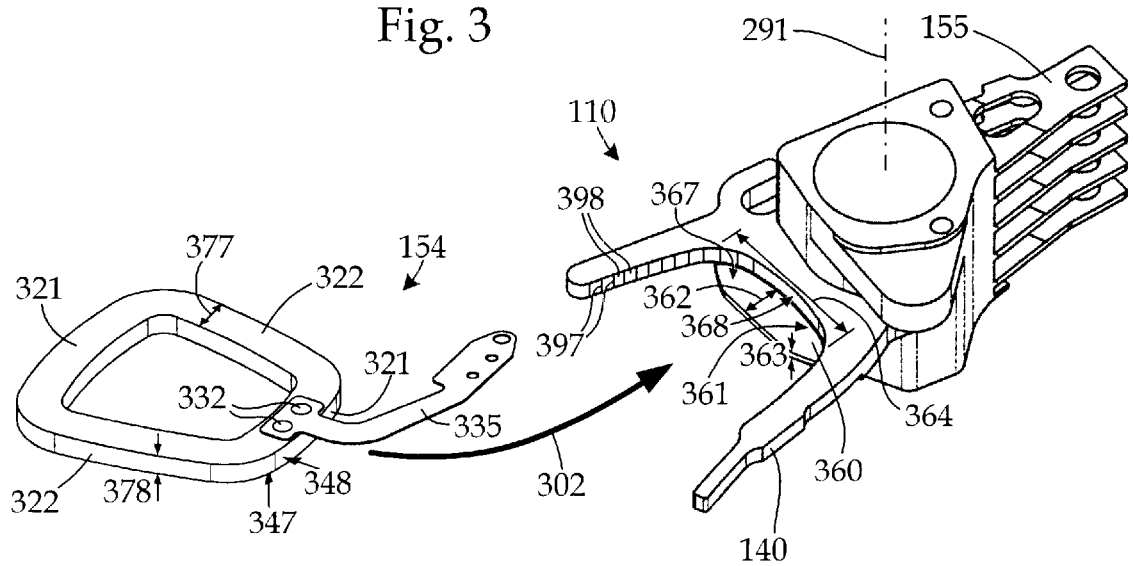
FIG. 3 shows an oblique bottom view of the pivot housing of FIG. 2, also showing how the voice coil is assembled into the pivot housing.

FIG. 3 shows an oblique bottom view of the pivot housing 110 of FIG. 2, inverted according to rotation indicator 301. FIG. 3 also shows how coil 154 fits into pivot housing 110, inserted according to indicator 302. Coil 154 is a copper-clad aluminum having a resin coating. 120 turns of wire are provided in a coil having a thickness 378 of about 60 mils, and having a width 377 more than twice the thickness 378. Coil 154 includes two circumferential sections 321 (with respect to axis 291) and two radial sections 322. (By a "radial" section, it is meant that substantially all of the wire is directed more radially than circumferentially.) Coil 154 also includes top & bottom horizontal surfaces 347 and inner & outer vertical surfaces 348. Two terminals 332 of coil 154 are coupled through flex connectors 335,164 to circuitry on board 167, so that the circuitry can controllably energize coil 154.

Coil support arms 140,141 have vertical surfaces 368 with peaks 398 and valleys 397 to enhance mounting. Epoxy injected between the vertical surfaces 348,368 thus has a thickness that varies from less than 0.45 to greater than 0.55 mm. Coil support arms 140,141 have an average vertical thickness about equal to the coil thickness 378, and structural layer 360 has a thickness 363 less than half as large. Structural layer also has a width 362 about equal to the coil width 377 over most of the length 364 of the layer 360.

An important structural feature of this embodiment is the concave surface 361 formed at the juncture of body 210, arm 140, and structural layer 360. Structural layer 360 stiffens coil support arm 140, substantially attenuating lateral distortions and vibrations. The concave surface 361 also allows significant heat transmission across both the vertical surfaces 348,368 and the horizontal surfaces 347,367, even if the minimum epoxy thickness is greater than 0.1 mm. It should be emphasized that a continuous layer of epoxy across all of the mounting surfaces 347,348,367,368 within about 1 mm of each other is difficult to achieve consistently for gaps much thinner than 0.02 mm. A preferred embodiment provides a gap that is large and uniform enough that an injected adhesive can penetrate substantially all (i.e. at least 99%) of the mating surfaces, substantially eliminating air gaps.

Figure 4:
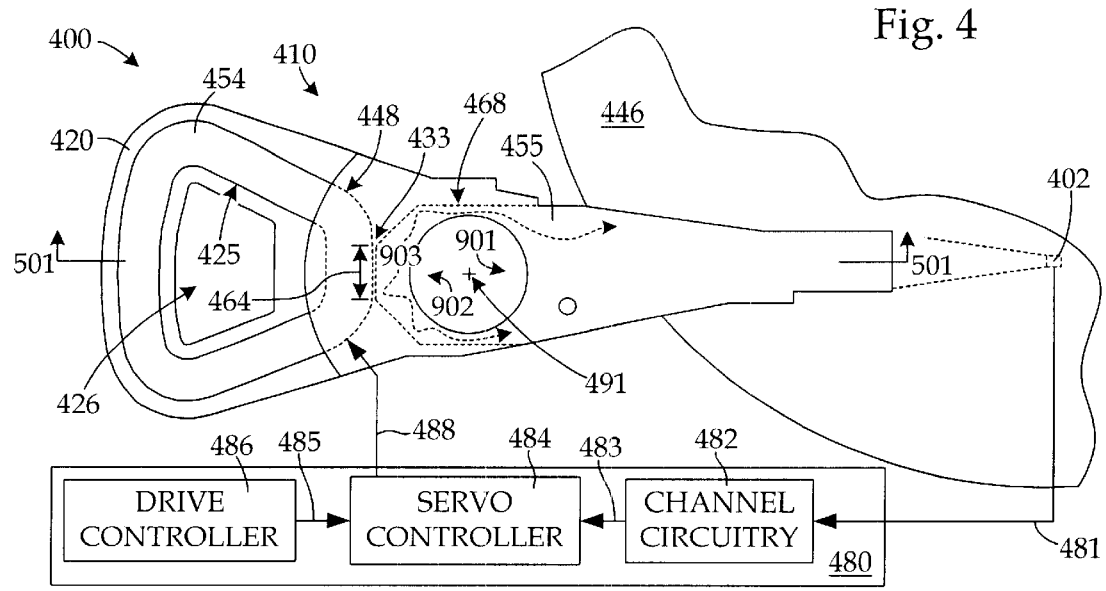
FIG. 4 shows another disc drive of the present invention, featuring an actuator assembly formed by injection molding a plastic body around a coil.

FIG. 4 shows another disc drive 400 having a system for positioning head 402 over disc 446. It includes an actuator assembly 410 formed by injection molding a plastic body 420 around a coil 454 and elongated, thermally conductive actuator arms 455. The plastic (preferably thermoplastic or thermo-set) extends along substantially all of the area of the vertical surfaces 425,448 of coil 454. The body 420 is made with a hole 426 within the area of the coil, reducing the rotational inertia of the actuator assembly about axis 491.

Each of the head-carrying arms 455 has vertical surfaces 468 that are assembled into vertical alignment in a spaced relationship prior to the step of injection molding. Further detail concerning a suitable assembly process is provided in U.S. Pat. No. 5,382,851 ("Swing-Type Actuator") issued Jan. 13, 1995 to Robert J. Loubier.

When the disc drive 400 is operating, head 402 provides a signal 481 to control circuitry 480. In addition to reading or writing data, channel circuitry 482 extracts a position-indicative signal 483 used by servo controller 484, which controls head position by driving a selected level of current 488 through the voice coil 454. In preparation for reading or writing at another location on disk 446, a drive controller 486 generates seek commands 485 that cause servo controller 484 to move to a different radial position on disc 446. This causes high and varying levels of current to pass through the coil during operation, depending on the seek speed, length, and frequency.

Note that the coils in prior art actuator assemblies formed with injection molded bodies (like those of Loubier) do not provide a substantial conduit for thermal conduction between the coil and the head-supporting arms. Thus, these coils vary widely in operating temperature, and therefor in operating resistance.

Figure 5:
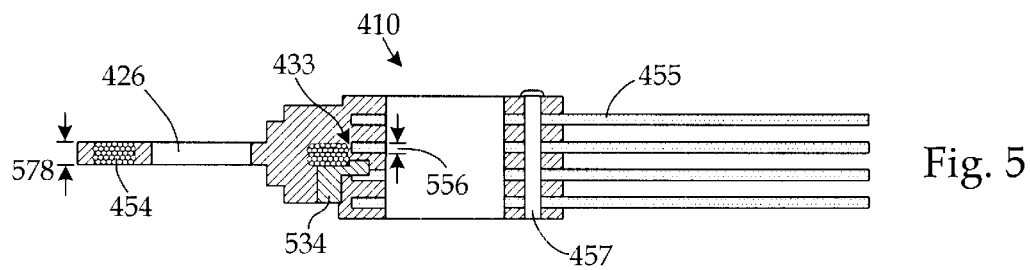
FIG. 5 shows a cross section of the actuator assembly of FIG. 4, showing the heat conduction gap between the voice coil and the heat sink structure.

FIG. 5 shows a cross section 501 of the actuator assembly of FIG. 4. Referring to FIG. 5, gap 433 has a height 556 at least equal to half of the thickness 578 of the coil 454 (shown on FIG. 5). Optional alignment element 534 is used to position coil 454 in a precisely spaced relationship with arms 455. During the formation of body 420, an arm 455 and the coil 454 are both urged against precision surfaces of the alignment element. For ease of manufacture, alignment element 534 is desirably made of an extruded or molded plastic having a higher melting temperature than that of the rest of body 420. Alternatively, alignment element 534 may be aluminum (forming a heat conduit to an arm 455 and obviating gap 433). FIG. 5 also shows a metal pin 457 providing a thermal and electrical coupling between all of the arms 455.

Figure 6:
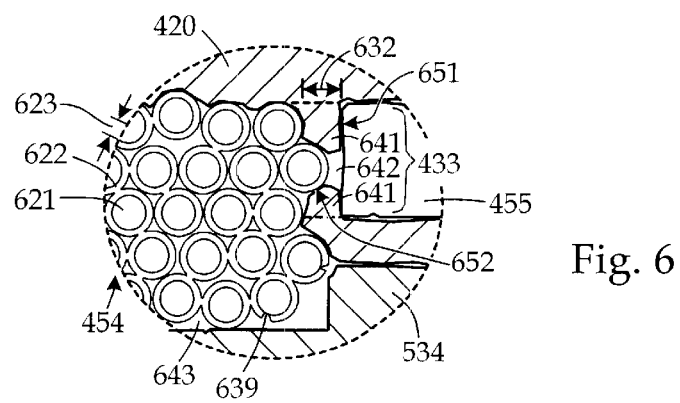
FIG. 6 shows an enlarged view of a portion of FIG. 4 in the vicinity of the gap.

FIG. 6 shows an enlarged view of actuator assembly 410 in the vicinity of gap 433. Gap 433 is formed where regular bonding surface 651 of arm 455 faces irregular bonding surface 652 of coil 454. Gap 433 has a height equal to the thickness 556 of the arms 455 and a length 464 of about 3 mm. Coil 454 has 37 turns of a wire 621 with a nominal (conductor) radius 623 and a resin cladding 622. Gap 433 has an average thickness 632 somewhat larger than the radius 623 of the wire 621. Because of the irregularity of coil surface 652, deviations from the average thickness 632 of up to 80% are likely to occur in several places along the length 464 of gap 433.

A minimum gap thickness of about 10% of the wire radius 623 is desirably maintained between the bonding surfaces 651,652. A method for providing such a minimum is provided in FIG. 8. Under these conditions, almost all of the volume between the bonding surfaces is likely to be filled with solid adhesive 641, although it is expected that a small fraction of the gap volume will continue to be occupied by air pockets 642. Large air pockets 643, such as will exist when the adhesive cannot penetrate, greatly inhibit effective thermal conduction. Note that compressing the coil against a large metal surface may cause unwanted electrical contacts (where there are defects 639 such as scratches) and coil deformation.

Figure 7:
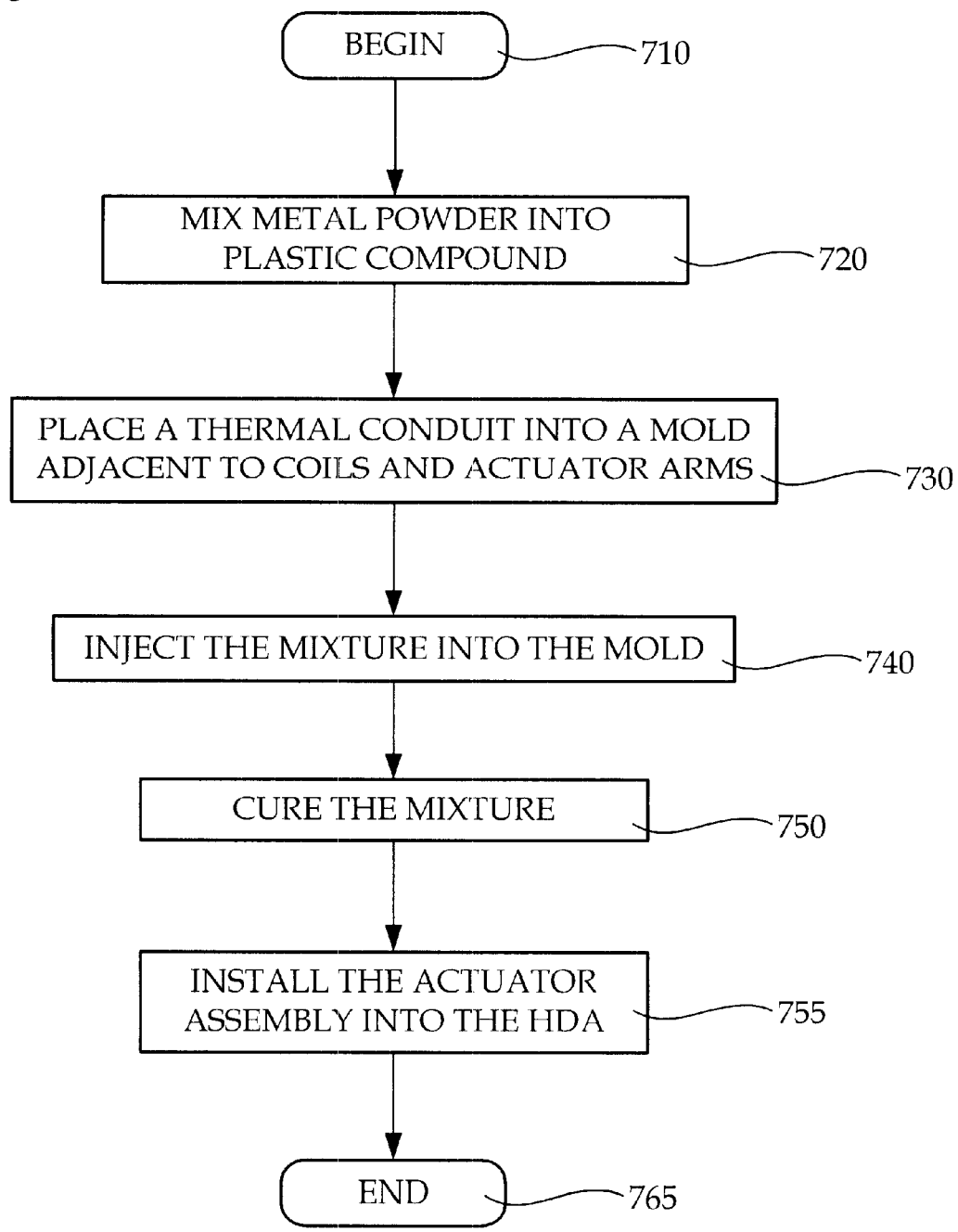
FIG. 7 shows a method for making a disc drive according to the present invention.

FIG. 7 shows a method of manufacture according to the present invention, comprising steps 710 through 765. A metal powder is mixed into a plastic compound 720, the mixture selected so as to maintain a suitable degree of fluidity to penetrate a large gap having a selected thickness less than about 0.3 mm. Carbon or glass powders may be used in addition to or instead of the metal powder. A thermal conduit is placed into a mold adjacent to the actuator arms and coil 730, forming a controlled gap adjacent the conduit large enough so the mixture will penetrate. The mixture is injected into the mold 740 and then cured 750. Finally, the actuator is installed into the head disc assembly (HDA) 755 in the vicinity of stationary voice coil magnets.

FIG. 8 shows another method of manufacture according to the present invention, comprising steps 810 through 855. A dielectric-clad coil is formed 815, such as by methods known in the art. A mounting surface is coated with another dielectric layer 820. The mounting surface may be on either side of the gap (see gap 433 and mounting surfaces 651 and 652 of FIG. 6). If the coating is formed 820 with a liquid, it is then allowed to harden. Next, an aluminum-filled resin fluid is applied to the other mounting surface 830. Of course, the fluid may also be applied as an additional coat on the coated surface. A preferred fluid for step 830 is a viscous (about 350000 cP or more) mixture of epoxy resin (45–55%), aluminum pigments (35–40%), elastomer (3–7%), dicyandiamide (3–7%), silica (1–5%), and urea (1%). Such a product is presently sold as "Scotch-Weld EW-2020" by 3M of St. Paul, Minn., as of this writing.

With the fluid in place, the mounting surfaces are urged together 835 with a modest force (about 10–50 millinewtons). Under these circumstances, the solid coating effectively maintains a minimum gap thickness while the fluid displaces air pockets that would otherwise exist in the gap. The assembly's position is maintained while it is baked 845, ideally for 20 minutes at 177° C. For this reason, the a dielectric coating material for step 820 which will not degrade during the step of baking 845. This method maintains suitable protection against shorting between a coil and a heat sink, while avoiding the expense of precision tolerances (i.e. manufacturing tolerances for components in the vicinity of coil 454 that are smaller than a radius 623 of the coil wire 621, typically adding to component cost). This heat sink is able to conduct a substantial portion of the excess heat energy in one or more voice coils to one or more air-cooled arms. As used herein, a "substantial portion" refers to about 10% or more.

Characterized more precisely, a first embodiment of the present invention is a disc drive 100,400 that includes a rotatable stack of discs 146,446 and stationary voice coil magnets 170,175. The disc drive also includes an actuator assembly 410 or a pivot housing 110 with an arm 155,455 (i.e. at least one) configured to extend above (i.e. adjacent) a moving surface of the stack so that rotation of the stack cools the arm(s) 155,455. The assembly supports a voice coil 154,454 that interacts magnetically with the magnets 170, 175 to controllably position the assembly within a fixed range 190. A drive controller 486 issues commands 485 to the servo controller 484, which drives a current signal 488 to control the coil 454. In a worst case series of seek commands 485, as would be understood by an ordinary designer of positioning systems for disc drives, average current magnitude through the coil 154,454 is maximized. For a worst case current of 0.50 amperes rms, for example, the present heat sink preferably conducts enough heat to the arm(s) so that no part of the coil exceeds 90 degrees C. For a layer of epoxy about 0.12 mm thick adjacent the horizontal surface 367 of FIG. 3, a simulation of the present invention was shown to maintain the temperature of the entire coil below 70 degrees C at 0.50 A rms.

Another embodiment of the present invention includes a pivot housing with a front end 901, a back end 902, and an axis of rotation 491 between the ends 901,902 (see FIG. 4). The front end 901 includes a rigid arm 455 configured to extend over a spinning disc 446. The back end 902 includes a fairly regular mounting surface 651 thermally coupled to the rigid arm 455 by a thermal conduit 903. Wire 621 has a nominal radius 623 (R) and a cross-sectional area (A), and is formed into coil 454 by winding it a fixed number (N) of times about a hole 426. An irregular bonding surface is thereby formed, and is arranged to face the regular bonding surface 651 of the thermal conduit 903. The bonding surfaces 651,652 are separated by a gap 433 containing a volume of a solid dielectric 641 greater than N*A*R, and a lesser volume of air pockets 642. The gap has an average thickness greater than R so that the (preferably viscous) dielectric can readily enter the gap. As explained above with reference to FIGS. 4–8, positioning systems of this embodiment have excellent manufacturability and thermal stability in the coil 454.

Another embodiment of the present invention includes a stationary magnet 170,175. A thermally conductive pivot housing 110 includes a rigid layer 360 bridging between the housing 110 and rigid coil support arms 140,141. The rigid layer 360 supports at least one 140 of the rigid arms so as to form a concave portion in the surface of the pivot housing adjacent the rigid arm 140 and the rigid layer 360.

All of the structures described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, the particular elements may vary depending on the particular application for the present system while maintaining substantially the same functionality, without departing from the scope and spirit of the present invention. In addition, although the preferred embodiments described herein are largely directed to configurations with stationary magnets, it will be appreciated by those skilled in the art that the teachings of the present invention can be applied to equivalent positioning systems without departing from the scope and spirit of the present invention.

What is claimed is:

1. A positioning system comprising:
   a stationary magnet;
   a pivot housing having a front end, a back end, and an axis of rotation between the front and back ends, the front end including a front arm configured to extend over a rotatable disc, the back end having a first surface coupled to the front arm by a thermal conduit;
   a wire having a nominal radius R and a cross-sectional area A arranged in a coil having N turns and positioned to interact with the stationary magnet to effect positioning, the coil having a second surface facing the first surface, the first and second surfaces-separated by a gap containing a volume of a solid dielectric greater than N*A*R and a volume of air less than N*A*R, the gap having an average thickness greater than R so that the volume of dielectric can enter the gap, in which the solid dielectric thermally couples the coil to the front arm and inhibits electrical conduction across the gap.

2. A disc drive including the positioning system of claim 1, in which the coil has an electrical resistance, the disc drive configured to execute a selectable series of seek commands, in which the thermal conduit is near enough to the coil so that no executable series of seek commands can cause the coil to become hot enough so that the electrical resistance increases by more than 2 ohms.

3. The positioning system of claim 1, in which the heat sink structure has sufficient thermal coupling to the coil so that a thermal energy surplus associated with a higher-than-ambient temperature in the coil will exit the coil mainly by conduction.

4. The positioning system of claim 1, constructed by performing steps of:

(a) positioning the coil and the front arm in a mold;

(b) injecting a bonding resin into the gap;

(c) providing a structural resin to form a body; .

(d) curing the resins;

(e) supporting a head via the front arm to form a complete actuator assembly;

(f) installing the actuator assembly, the rotatable disc, and the stationary magnet into a head disc assembly; and (g) sending a current to the coil to effect selective positioning.

5. A positioning system comprising:

a rotary actuator comprising a voice coil and an air-cooled arm, the rotary actuator configured for performing several seek operations; and a heat conduit in contact with the air-cooled arm for conveying excess heat from the voice coil to the air-cooled arm to stabilize the temperature of the voice coil during the seek operations, the conduit including a body, the conduit further including a rigid arm and a rigid layer protruding radially from the body, the rigid layer supporting the rigid arm forming a concave portion in the surface of the conduit adjacent the rigid arm and the rigid layer, the concave portion configured to receive the voice coil, the voice coil having a first exterior surface that is thermally coupled to the concave portion, the rigid arm, the rigid layer, and the body through an adhesive layer having an average thickness less than about 0.5 millimeters.

6. The positioning system of claim 5 in which the rigid arm is a first yoke arm, the conduit also including a second yoke arm, the yoke arms protruding radially from the rotary actuator adjacent the voice coil.

7. A disc drive comprising the positioning system of claim 5, further comprising a voice coil magnet having a surface facing a portion of the voice coil, in which voice coil magnet does not face the rigid layer.

8. The positioning system of claim 5, in which the rigid arm is in direct contact with the body.

9. The positioning system of claim 5, in which the first exterior surface is an outermost surface of the voice coil.

* * * * *